United States Patent
Beresnevichiene et al.

(10) Patent No.: US 9,607,155 B2
(45) Date of Patent: Mar. 28, 2017

(54) METHOD AND SYSTEM FOR ANALYZING AN ENVIRONMENT

(75) Inventors: Yolanta Beresnevichiene, Bristol (GB); Jonathan F. Griffin, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1421 days.

(21) Appl. No.: 12/916,277

(22) Filed: Oct. 29, 2010

(65) Prior Publication Data

US 2012/0110671 A1    May 3, 2012

(51) Int. Cl.
  G06F 21/00    (2013.01)
  G06F 21/57    (2013.01)
  G06F 9/44     (2006.01)

(52) U.S. Cl.
  CPC .............. *G06F 21/577* (2013.01); *G06F 8/10* (2013.01)

(58) Field of Classification Search
  CPC .................................. G06F 21/577; G06F 8/10
  USPC .......................................................... 726/25
  See application file for complete search history.

(56) References Cited

U.S. PATENT DOCUMENTS

| | | |
|---|---|---|
| 7,130,779 B2 | 10/2006 | Beverina et al. |
| 7,315,801 B1 | 1/2008 | Dowd et al. |
| 7,472,421 B2 | 12/2008 | Cummins |
| 2001/0027388 A1 | 10/2001 | Beverina et al. |
| 2003/0149657 A1 | 8/2003 | Reynolds et al. |
| 2005/0050210 A1 | 3/2005 | Kennedy |
| 2005/0066195 A1 | 3/2005 | Jones |
| 2005/0193430 A1 | 9/2005 | Cohen et al. |
| 2006/0265324 A1 | 11/2006 | Leclerc et al. |
| 2007/0006046 A1 | 1/2007 | Overman et al. |
| 2007/0044153 A1 | 2/2007 | Schuba et al. |
| 2007/0061125 A1* | 3/2007 | Bhatt et al. ..................... 703/20 |
| 2007/0113281 A1 | 5/2007 | Leach |
| 2007/0180509 A1 | 8/2007 | Swartz et al. |
| 2008/0005555 A1 | 1/2008 | Lotem et al. |
| 2008/0077474 A1 | 3/2008 | Dumas et al. |
| 2008/0098479 A1 | 4/2008 | O'Rourke et al. |

(Continued)

FOREIGN PATENT DOCUMENTS

WO   WO-2008/060308 A2    5/2008

OTHER PUBLICATIONS

Y. Beres, J. Griffin, S. Shiu, "Security Analytics: Analysis of Security Policies for Vulnerability Management", Sep. 30, 2008, HP Labs Technical Report HPL-2008-121 and ACSAC 2008, pp. 1-20.*

(Continued)

*Primary Examiner* — Brandon Hoffman
*Assistant Examiner* — Thong Truong
(74) *Attorney, Agent, or Firm* — Hewlett Packard Enterprise Patent Department

(57) ABSTRACT

A system for analyzing an environment to identify a security risk in a process, comprising a model engine to generate a model of the environment using multiple components defining adjustable elements of the model and including components representing a patching process for the environment, a risk analyzer to calculate multiple randomized instances of an outcome for the environment using multiple values for parameters of the elements of the model selected from within respective predefined ranges for the parameters, and to use a results plan to provide data for identifying a security risk in the patching process using the multiple instances.

20 Claims, 9 Drawing Sheets

(56) References Cited

U.S. PATENT DOCUMENTS

| | | | |
|---|---|---|---|
| 2008/0103786 A1 | 5/2008 | Zhang et al. | |
| 2008/0148398 A1 | 6/2008 | Mezack et al. | |
| 2008/0222731 A1 | 9/2008 | Dowd et al. | |
| 2008/0262981 A1 | 10/2008 | Supatgiat et al. | |
| 2009/0007270 A1 | 1/2009 | Futoransky et al. | |
| 2009/0077666 A1 | 3/2009 | Chen et al. | |
| 2009/0083695 A1 | 3/2009 | Mir et al. | |
| 2009/0106846 A1 | 4/2009 | Dupray et al. | |
| 2009/0327971 A1 | 12/2009 | Shostack et al. | |
| 2010/0125912 A1* | 5/2010 | Greenshpon et al. | 726/25 |
| 2010/0311496 A1* | 12/2010 | Taylor et al. | 463/25 |
| 2012/0005646 A1* | 1/2012 | Manglik et al. | 717/105 |
| 2012/0150910 A1* | 6/2012 | Friedlander et al. | 707/770 |

OTHER PUBLICATIONS

Y. Beres, M. Mont, J. Griffin, S. Shiu, "Using security metrics coupled with predictive modeling and simulation to assess security processes", Oct. 11, 2009, ESEM '09 Proceedings of the 2009 3rd International Symposium on Empirical Software Engineering and Measurement pp. 564-57.*

Y. Beres, J. Griffin, S. Shiu, M. Heitman, D. Markle, P. Ventura, "Analysing the Performance of Security Solutions to Reduce Vulnerability Exposure Window", Dec. 8-12, 2008, 2008 Annual Computer Security Applications Conference, pp. 33-42.*

Mont, Marco Casassa, Adrian Baldwin, Simon Shiu, and Paul Collins, "Job Design: Providing Strategic Decision Support for Risk Analysis and Policy Definition", < http://www.hpl.hp.com/techreports/2010/HPL-2010-35.pdf >.

Greitzer, Frank L., Patrick R. Paulson, Lars J. Kangas, Lyndsey R. Franklin, Thomas W. Edgar, and Deborah A. Frincke, "Predictive Modeling for Insider Threat Mitigation", < http://www.pnl.gov/coginformatics/media/pdf/TR-PACMAN-65204.pdf > Apr. 2009.

"Octave," Information Security Risk Evaluation, Oct. 16, 2009, (Last Updated: Sep. 17, 2008), 1-page, Carnegie Mellon University, Available at: <web.archive.org/web/20091016012425/http://www.cert.org/octave/>.

Jack A. Jones, "An Introduction to Factor Analysis of Information Risk (FAIR)," Apr. 2, 2009, pp. 1-3, Available at: <web.archive.org/web/20090402124106/http//fairwiki.riskmanagementinsight.com/>.

Lawrence A. Gordon and Martin P. Loeb, "The Economics of Information Security Investment," ACM Transactions on Information and System Security, Nov. 2002, pp. 438-457. vol. 5, No. 4, ACM.

Steve Beattie et al., "Timing the Application of Security Patches for Optimal Uptime," 2002 Lisa XVI, Nov. 3-8, 2002, Philadelphia, PA, USA, pp. 101-110, Available at: <homeport.org/~adam/time-to-patch-usenix-lisa02.pdf>.

Thomas R. Peltier, "Facilitated Risk Analysis Process (FRAP)," 2000, pp. 1-21, Auerbach Publications, CRC Press LLC, Available at: <ittoday.info/AIMS/DSM/85-01-21.pdf>.

Yolanta Beres et al., "Optimizing Network Patching Policy Decisions," Jul. 6, 2009, pp. 1-28, Hewlett-Packard Development Company, L.P., Available at; <hpl.hp.com/techreports/2000/HPL-2009-153.pdf>.

* cited by examiner

METHOD AND SYSTEM FOR ANALYZING AN ENVIRONMENT

BACKGROUND

In complex and generally large scale systems and organizations such as corporate Information Technology (IT) infrastructures for example, there exist potential impacts to the security of the system. Such security vulnerabilities, even if they can be discovered and defined in a meaningful way, are typically difficult and costly to assess. This can be because of the number and nature of the vulnerabilities for example, as well as the number of assets present in such large systems, all of which can have an impact on potential solutions which vary greatly.

A security operations team in a typical organisation has a number of security controls at its disposal, such as patching, antivirus, client side firewalls, and so on, that together minimise the exposure of the organisation's systems to risks or vulnerabilities. However, it is notoriously difficult to evaluate how effective these security mechanisms are at protecting an organisation, and even harder to estimate the impact of a change in a security mechanism investment choice or a change in policy. Examination of historical data gives partial answers. For example, it is typically possible to track how long the deployment of a particular patch takes, but without the context of an external threat environment, the historical data cannot help determine if systems were left exposed for too long, thus yielding unacceptable risk.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

One of the tasks faced by a security operations team in an environment such as a corporate IT infrastructure for example, is vulnerability and patch management. Multiple systems running popular business operating systems and applications in a large organization may periodically have patches deployed in order to secure vulnerabilities, such as system flaws or other holes in security of the system which could allow threats to infiltrate the system, or leave a security risk unmitigated. However, deploying patches across all of these systems in a timely manner is not simple. In addition to the time spent on patch assessment and patch testing, the security operations team often faces restrictions for deploying the patches imposed by the business, in terms of allowed system downtime and minimal business disruption. Thus, in addition to patching, organizations usually deploy other mitigations such as antivirus, client side firewalls, and network level protections for example. These measures aim to mitigate and prevent the spread of potential malware or malicious infections, as well as attacks that exploit vulnerabilities that exist pending patching.

In a system of an organization, vulnerabilities can be related to: the physical environment of the system, the personnel management, administration procedures and security measures within an organization, business operation and service delivery, hardware, machine readable instructions, communication equipment and facilities, and their combinations. Examples of vulnerability exploits include an attacker finding and using an overflow weakness to install malware to export sensitive data; an attacker convincing a user to open an email message with attached malware; an (organization) insider copying a hardened, encrypted program onto a thumb drive and cracking it at home; flood damage to systems installed (on a ground floor) for example. Other alternatives are possible.

Figure 1:
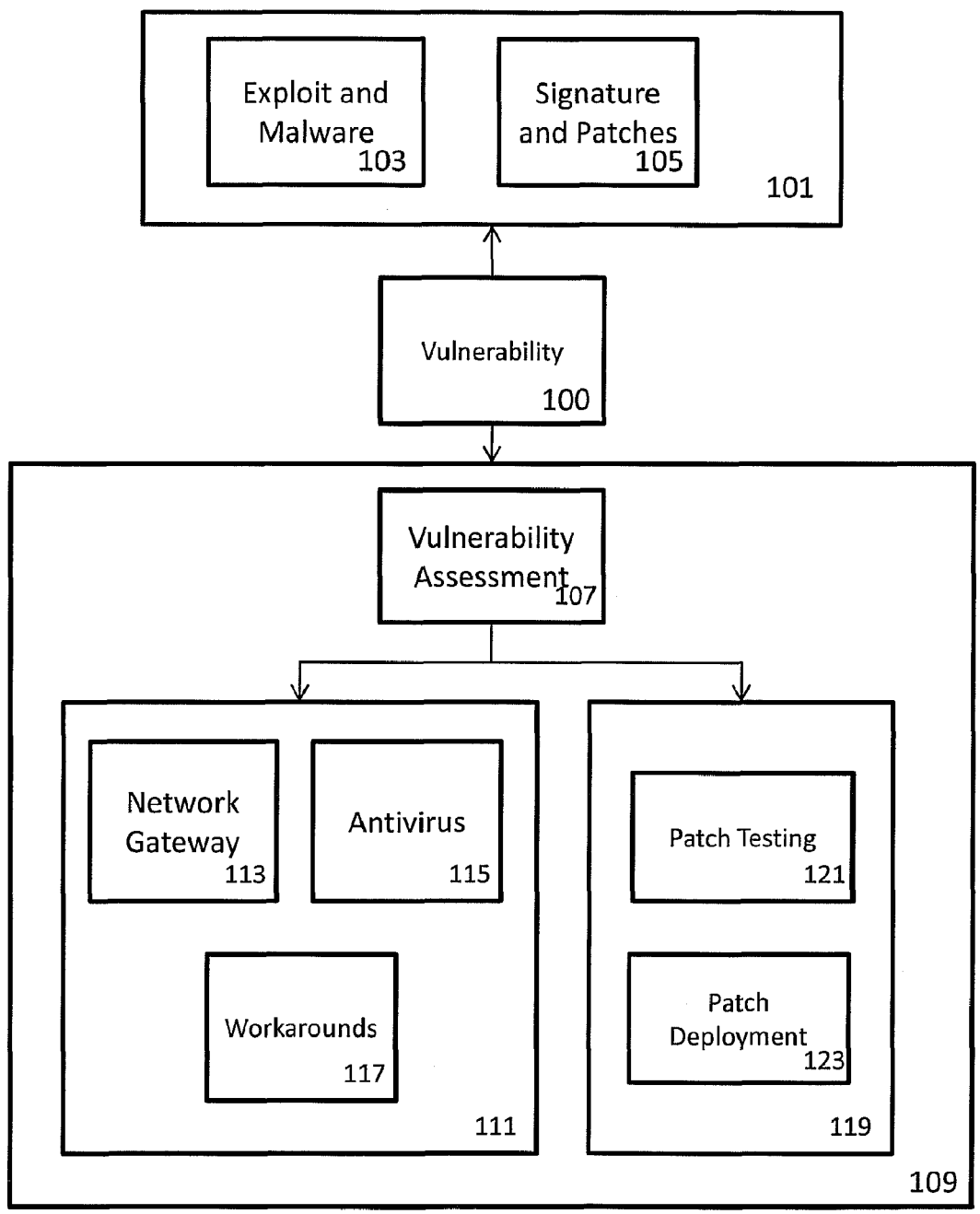
FIG. 1 is a schematic block diagram of a method of vulnerability and patch management processes according to an example.

FIG. 1 is a schematic block diagram of vulnerability and patch management processes according to an example. A vulnerability 100 such as a security risk—that is to say, a system weakness which allows an attacker to reduce the system's information assurance—can be exploited or fixed. For example, in an external environment 101, the vulnerability can be used to exploit a system or environment in which it is present using malware for example (103). A signature and patch(es) 105 for the vulnerability 100 can be generated in response to the detection of the vulnerability. This can be in response to knowledge of an exploit and malware, or can be a proactive measure to prevent an exploit occurring for example. Internal (to an organization) processes 109 proceed by assessing the vulnerability 100 in block 107 to determine the nature and potential impact of the vulnerability. As a result of the assessment 107, mitigations 111 in the form of mitigating controls, patch management 119 or both can be deployed in a system or environment in order to counteract the vulnerability 100. Mitigations 111 in the form of mitigating controls for the system or environment can include antivirus deployment 115, putting workarounds 117 in place, installing a network gateway 113 to monitor and interpose on network connections and traffic, or some combination. Other mitigating controls are possible. Patch management 119 can include testing of a patch 121 in order to determine its effectiveness at counteracting the vulnerability, as well as determining an effect on the system, such as disruption to services and systems as a result of downtime for example. Following testing 121, patch deployment 123 can proceed, in which a patch or multiple patches are applied to systems of the environment in which the vulnerability was discovered, or which could be affected. For example, patches can be applied to servers hosting an operating system which is used to execute tools used in an organization. Patches could also typically be deployed on individual user workstations for example.

Typically therefore, once a vulnerability in a system or environment has been discovered, the process of deploying patching in order to prevent the vulnerability from being exploited or to mitigate the effects of any exploitation is a balance between ensuring an effective and prompt solution to the issue or risk and ensuring that any systems which would be affected by patching or prolonged exposure to a vulnerability are disrupted as little as possible, especially systems where any downtime as a result of patching could be undesirable and is often restricted to business specified time periods.

According to an example, a system and method includes construction of a dynamic model of operational vulnerability management processes in an organisation, environment or system. Once the behaviour of the model matches the relevant behaviour characteristics of the underlying environment, for example by adjusting the model so that the model reflects changes in the system, inferences can be drawn about the effects of the changes by running experiments to calculate results using the model. These results provide information regarding overall effectiveness of protection mechanisms or specific patching policies. The results are also used to explore if it is possible to achieve an optimum balance between minimizing security risk and not increasing system downtime.

According to an example, a method and system for analyzing a security risk as a result of vulnerability includes generating a model including multiple elements taken from: external environment parameters; internal workflows and decision points in a vulnerability assessment and patching process for the environment; and multiple mitigating actions. The external environment parameters are modelled as events in the external environment that directly affect the decisions organizations take when determining when to deploy security mitigations. An organization can start its patch management process when the patch is released, finally reducing the risk when the patch is fully deployed. The resulting exposure risk depends on the timing and dynamics of such external events. According to an example, such events are defined stochastically, by specifying probability distribution functions to generate events. Once a vulnerability is published, it can be assumed that there is an internal assessment of this vulnerability. This assessment is desired to determine how to manage patches across the vulnerable client population. Typically, the patch management is further divided into the following categories: Emergency; this patch management route constitutes patch testing with the highest priority and expedited patch deployment across a vulnerable population; an Accelerated patching route would mean that the patch testing is done with slightly higher priority than normal and often has faster patch deployment; Business as Usual (BAU) is taken after initial assessment and when there is a patch released by the vendor. BAU patching means a predefined time for a patch to be released by the testing team, and that patch deployment is done according to a policy dictated by a number of days for deployment.

Various additional mitigations can be effective in protecting an environment from vulnerability exploits and malware. For example, these might include: Antivirus plus buffer overflow protection across the full client population; a network gateway that could protect the full client population from vulnerability exploits by, for example, using protection and/or monitoring mechanisms implemented on network equipment which connects the organization's internal network to the external Internet; restriction of administration privileges on user machines and so on. These forms of protection are typically effective in preventing malware installing itself on user machines, however, in addition emails to employees can be sent in certain cases when a vulnerability is deemed serious. For example, emails can be sent to employees advising them to avoid using particular applications or equipment at all, or particular features. Other communication channels for communicating such information to individuals can be used. In addition, temporary workarounds can be deployed in some circumstances, usually when a vulnerability is considered dangerous and other protections are not effective, and so on.

Figure 2:
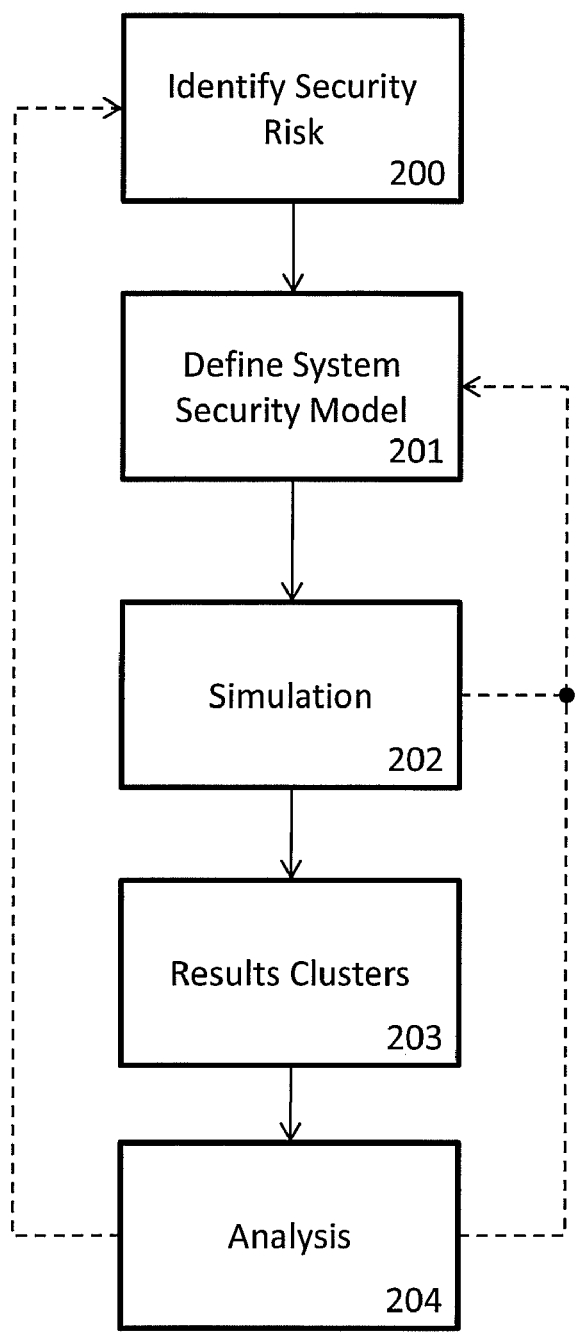
FIG. 2 is a schematic block diagram of a method for analyzing an environment according to an example.

FIG. 2 is a schematic block diagram of a method for analyzing a system according to an example. In block 200 a potential security risk for the system is identified. This can include a characterization of an issue, such as a characterization provided by a decision-maker in an organization for example (e.g., a client organization's Chief Information Security Officer—CISO). For example, the organization may consider investing in specific solutions to better manage access privileges of its users. Associated with this investment, the CISO has a range of choices for the nature of the resulting system configuration, including security controls and specific solutions, and a range of preferences among the security outcomes. The identified security risk could therefore be a risk associated with a lack of implementation of identity and access controls for example. According to an example, this is a discovery or identification phase.

In block 201, the dynamics of the outcomes determined in the identification phase are explored by constructing an executable system security model of the system in the context of its dynamic threat and economic environments. Accordingly, in this modeling stage the architectural, policy, business process, and behavioral constraints which are inherent in the security issue or risk are captured and formalized. According to an example, threat environment characteristics such as potential attacker behavior, threat vectors and probabilities and other externalities that may influence an internal business process or human behavior in the organization are identified and captured in the model as events. The modeling stage includes observations of stages and decision points of the system involved. According to an example, the modeling cycle can be repeated until a model is determined to sufficiently capture the decision making situation. For identity and access control, a model can define the way in which the organization in question will be affected if (and how) certain access control systems are implemented. Accordingly, the model can be used to demonstrate the security risk in an environment as a result of a lack of implementation, or an implementation not aligned with operational characteristics of the organization or not appropriately addressing the risk.

According to an example, defining a model 201 or representation includes using a set of internal and external components to represent aspects of the security risk under consideration, which aspects may influence the security risk, and influence the way in which the risk affects an organization. External components may correspond to a threat environment and can include the rate of discovery of vulnerabilities, a speed to develop exploits, a speed to develop patches and signatures, attacker behavior etc. Internal components can include specific tasks undertaken in security operations, a speed with which these tasks are undertaken, a length of time to undertake the tasks, and specific security solutions and mechanisms and their properties. This might also include behavioral aspects that affect security, such as personnel movements and habits (such as writing a password down for example). Components can be static or dynamic—that is to say, a component can have a behavior in a model which is dependent on previous decision points, or can be a component which generates a value from an associated probability distribution such that the value can change dynamically in response to repeated runs of a model and in response to an input value received by the component (which affects the output). According to an example, a model or representation can be a graphical model or representation, or a representation provided in another form, such as a textual representation for example, in which aspects of a model are represented by respective portions of marked up text for example.

In deriving a model, considerations which include the investment choices which can be made, and a set of measures representing a search domain for choices can be taken into account. For example, a particular investment choice could include the provision of installing biometric sensors at various locations and with varying complexity at certain positions within an organization, or applying a patch to certain system in an environment. Accordingly, a search domain for the choices can include ranges associated with a number, location and complexity of sensors. Variation of these parameters within the defined ranges will typically result in multiple outcomes which affect the way in which an associated security risk may (or may not) be mitigated—in this context a risk may include denying access to authorized personnel, or a failure to install a sensor in a location thereby allowing access where it should actually be more strictly controlled. According to an example, a search domain or range for a parameter can be derived in an identification phase and based on characteristics of the environment to be modeled, and based on how the risk is managed in an organization embodied by the representation of the environment. It can be modified in response to an indication that the range is not suitable. For example, for a given search range, a set of outcomes can lead to a conclusion that the range needs to be altered in order to encompass a different space of results which may be more suitable for determining how to mitigate a certain risk.

In block 202, the model of block 201 is used in order to generate data in the form of results clusters 203 which can be used for analyzing (block 204) the system in view of the risk or solution. That is to say, using the model, behavior is simulated using the representation of a dynamic threat and economic environment by exploring the search domains in order to provide results clusters 203 which can be in the form of multiple output configurations for the situation or risk. The output configurations represent outcomes associated with choices which can be made to mitigate the effects of the identified security risk in the system. Results and conclusions can be validated against the preferences of the decision-maker, such as the CISO for example. In case they do not match the preferences, further refinement of the risk or components can take place. Alternatively, if a search domain is determined to be unsuitable it can be widened or narrowed in scope.

Accordingly, a system according to an example uses a model corresponding to a characterization of a risk or issue in a dynamic threat environment determined in an identification phase to provide a set of output calculations which are used to determine a solution, perhaps including refinement of the initial identification and/or model. As indicated by dotted lines in FIG. 2, an identified risk and/or a model can be refined or altered in response to findings from a simulation or analysis phase.

Figure 3:
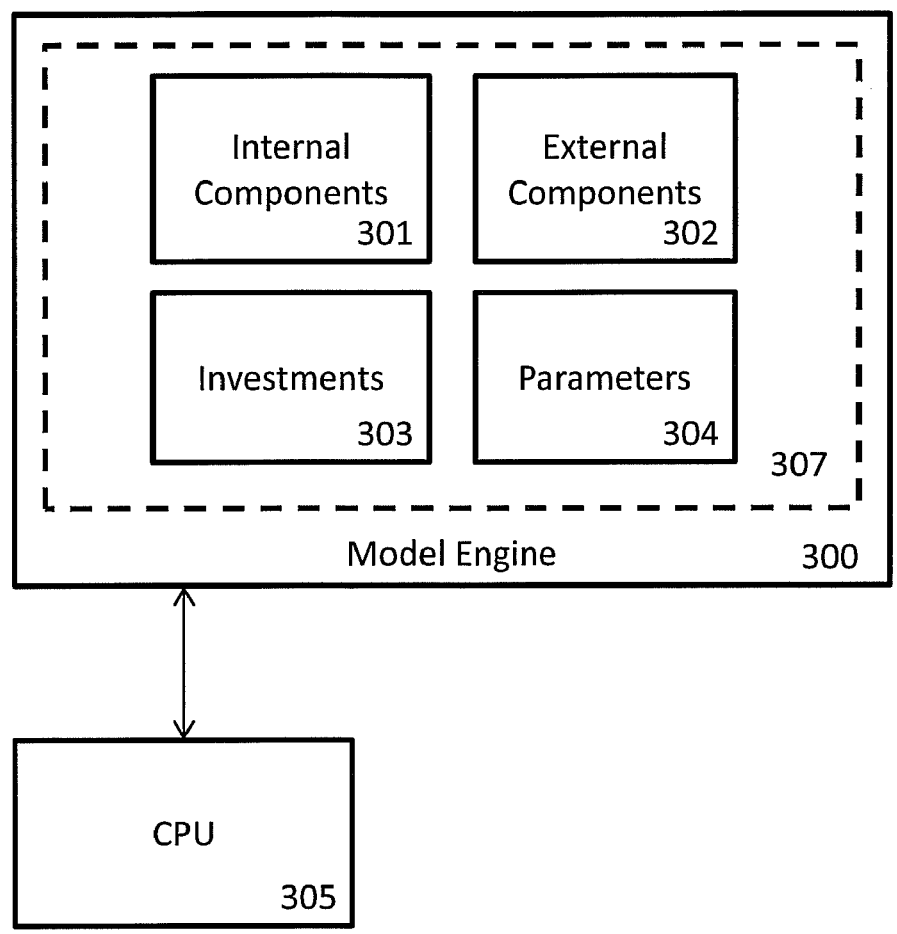
FIG. 3 is a schematic block diagram of a model engine according to an example.

FIG. 3 is a schematic block diagram of a model engine according to an example. Model engine 300 is used to define and build a model of a system for exploration of a potential security risk. A model engine 300 uses a set of internal 301 and external 302 components to form a model 307. Engine 300 further includes data representing a set of investment choices 303, and a set of related parameters 304 for the model 307. Parameters 304 affect stochastic randomized elements within the model 307. Typically, parameters 304 can vary over a range defining a desired or acceptable interval for a particular metric associated with a change. As an example, the implementation of a patching process in an environment in order to secure a vulnerability will typically involve a financial investment. An associated set of parameters could be a number of systems to be patched in the environment, as well as a timeframe for patching for example. Variation of these parameters within a given interval will lead to a number of outcomes based on the investment in view of the external threat environment.

According to an example, the model engine 300 can be functionally linked to a processor 305 (CPU) for performing calculations for the engine. Other connections to the model engine 300 have been omitted in FIG. 3 for the sake of clarity. Internal 301 and external 302 components define elements of the model 307 which are used to define a system, security risk or issue. Investments 303 include data representing a set of changes which can be made in an environment such as an organization according to the model 307. The changes can relate to a change in any of a process, product, workflow and workforce for example. Such changes can cause an investment in time, money or other resources to be deployed. As such, the changes will typically involve some form of effort in order to be implemented—that effort can be purely financial in nature, or could involve a cost neutral change or could be a combination of a cost and some other effort for example. According to an example, a change can include the provision of determining a security vulnerability or risk, and the provision of patching in order to mitigate the effects (actual or potential) of the determined vulnerability or risk.

Typically, an investment 303 will be a financial investment, either direct or indirect—for example, implementing a new process, tool, product or workflow to mitigate the effects of an identified security risk, and/or releasing some proportion of a workforce to perform tasks aimed at mitigating the risk, and/or engaging additional workforce. Some investments may be less straightforward to quantify. For example, an investment in a behavioral change such as a change in a process or workflow which is performed by some proportion of a workforce, can be parameterized in various different ways. One possible way to parameterize such an investment could be by determining a temporal range as a result of possible delays to some portion of a workflow as a result of a change intended to make the workflow more robust, such as by a person interposing on certain actions to verify consistency and/or accuracy for example.

According to an example, engine 300 is therefore used to generate a model 307 for an aspect of a system which can include a security risk using multiple ones of the internal 301 and external 302 components, which components define adjustable elements of the model 307. The components and the relationships and functional links between the components define the model (relationships can be causal, communication of data, links to shared resources or queues, etc.). The aspect of the system can include a process, workflow, and product. The generated model is used to perform a set of calculations to explore a space of outcomes using different intervals for multiple parameters 304, such as under different investment choices or under specific conditions in the threat environment for example. According to an example, a risk analyzer is used to perform calculations in a consistent manner. It supports the process of defining discrete combinations of parameter variations (experimental cases) and can generate/manage structures to hold simulation data, perform repeated randomized runs within each experimental case, and gather basic statistics for each experimental case, including confidence intervals (standard error) for example.

Figure 4:
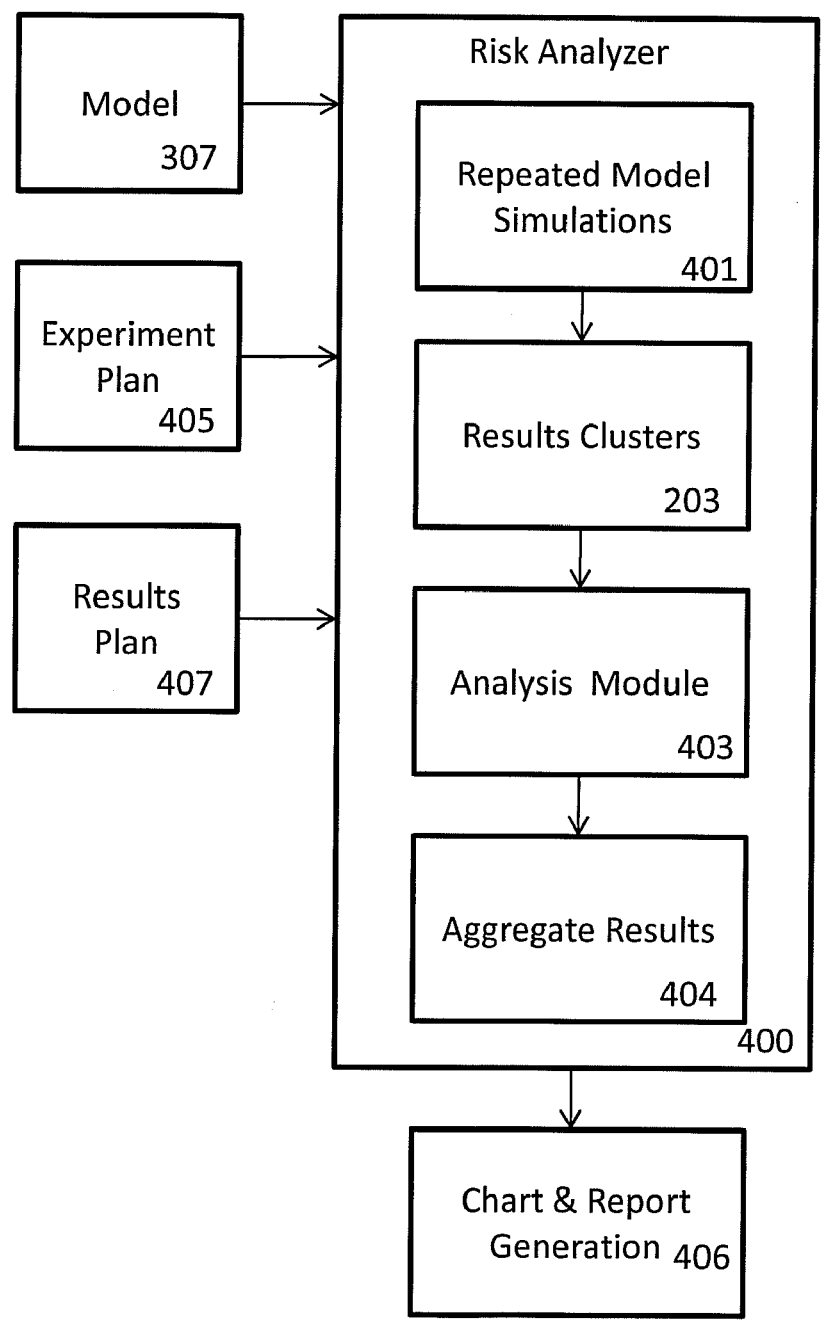
FIG. 4 is a schematic block diagram of a process for performing a set of calculations using a risk analyzer according to an example.

FIG. 4 is a schematic block diagram of the process for performing a set of calculations using a risk analyzer 400 according to an example. Output from risk analyzer 400 is typically determined by several pieces of information—the given model 307, an experiment plan 405, and a results plan 407. The model 307 identifies the system to be investigated in terms of its process behavior. This process behavior is subject to the (numerical and structural) parameters 404 that affect stochastic randomized elements within the model. Accordingly, the model can be indicative of a security risk in an environment 100 by virtue of the fact that it models a particular process susceptible to threats and access control issues. An experiment plan 405 sets out which of the parameters 404 are to be varied and what the variation will be (typically in terms of ranges or intervals, as described). Parameter values may also be discrete symbolic expressions. According to a results plan 407, a bulk dataset of multiple results clusters 402 is generated within the scope of the experiment plan 405. For example, an experiment plan 405 may specify that a certain parameter be varied within a given range—each discrete value of that parameter within the specified range can provide a results cluster. A results plan 407 identifies results to present from the generated results clusters 402. For example, as described, multiple results clusters 402 may include data representing the effect of variation of a parameter in a specified range. A results plan 407 can specify that data from multiple such clusters 402 be used to generate a visual representation of the way in which variation of the parameter affects the security risk.

Accordingly, a set of parameters 404 of a model 307 are varied in a set of repeated randomized model simulation runs 401 according to an experiment plan 405 which includes data representing which of parameters 404 to vary, a range for the variation, and an associated granularity for the variation (such that variations are performed in integer multiples of units of the parameter in question, or some other multiple for example). An experiment plan 405 and a results plan 407 can be provided in terms of a simple text format or in another marked up format such as XML for example. In order to cause randomization in the runs, each run within each case is provided with a random seed that is used to prime a Pseudo-Random Number Generator that provides for the randomized choices made during a simulation. These initial 'seed' values are provided in terms of an independently generated list of random integers (a seed file). For example, if a model of an environment E in which there exists a security risk S1 comprises multiple components $\{C\}=[C1, C2, \ldots Cn]$, with an associated set of parameters $\{P\}=[P1, P2, \ldots Pm]$ representing adjustable measures for the components (wherein each component in $\{C\}$ may have multiple parameters associated with it), an experiment plan 405 can define which of the $\{P\}$ are adjusted and a range for adjustment. So for example, if experiment plan 405 describes that a subset of $\{P\}$ be used, an initial seed can be used to generate random numbers which are used to determine values for these parameters (within their respective ranges). Each set of values for parameters forms a 'run', so that multiple runs are performed within the search scope of parameters, thereby providing results clusters 402 (i.e. multiple output configurations calculated using the risk analyzer 400). In this way, the search space for parameters can be explored. That is to say, repeated runs 401 are performed according to the experiment plan within the search intervals defined and using the list of random numbers. The output from a set of repeated runs forms a results cluster 402 representing the set of possible outcomes according to the randomized runs using the model in view of the experiment plan. An analysis module 403 can take the clusters 402 as input and can aggregate the results 404 according to the results plan 407. In this connection, aggregating results in block 404 of analyzer 400 allows data from multiple experiments (multiple results clusters 402) to be presented in a manner that is comprehensible to the stakeholders and that usefully shows outcomes in terms of risk exposure. Representation can be done in the form of charts and tables and to support this, a charting and report generation component 406 can be used is used. Component 406 can calculate statistical results/information gathered over runs. For example, histograms can be calculated to show frequency plots of how many values fall within particular ranges (bins). These can be useful descriptions of probability information and indicate where the most frequent range of values arises. Also, time series charts can be provided to show how selected quantities vary over time.

A different experiment plan can specify that a different subset of $\{P\}$ is used—for example, to explore the way in which different investment choices can affect a situation or risk. Accordingly, corresponding clusters of results can be obtained which may be different even though the same model is used. According to an example, a specific investment choice can be explored using outputs from risk analyzer 400 operating under different experiment plans 405.

Figure 5:
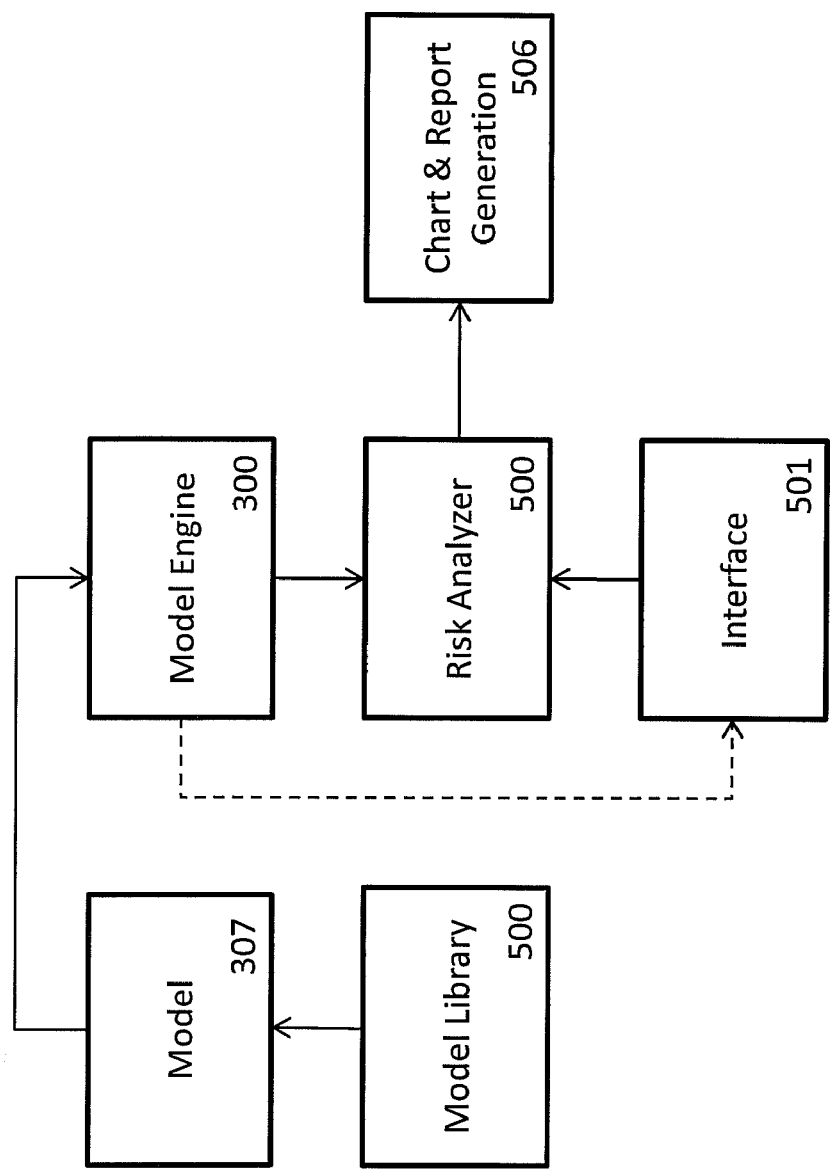
FIG. 5 is a schematic block diagram of a system for according to an example.

FIG. 5 is a schematic block diagram of a system according to an example. A model library 500 includes multiple generic models for a system for analyzing a security risk. For example, model library 500 can include common or nonspecific model templates which can be augmented or amended based on the specific security risk or environment under consideration. A model 307 for a risk is selected from model library 500 and input to model engine 300. According to an example, the model engine 300 receives data representing a model and translates (compiles) objects or components from the model to machine readable code. An intermediate action can be used according to an example, in which objects or components are compiled into intermediate instructions for the system which can then be compiled into fully machine readable instructions.

According to an example, each model component can have a unique shape type associated with it which has a corresponding class which contains machine readable instructions for communicating with the model engine 300. According to an example, the shape type for a component can be provided as a graphical representation for the component which is distinct from other components thereby allowing a user of the system to distinguish between components, such as when altering or creating a model for example. A link between graphical representations provides a logical flow for a model. The model 307 as compiled by the model engine 300 is used by the risk analyzer 400 in order to generate a set of output configurations as described above.

In block 506, chart and report generation uses the results from risk analyzer 400. An interface 501 can be used according to an example to allow users to explore and conduct investigations quickly by using the output from a modeled situation, or by allowing a user some degree of control over the way in which a situation is investigated. More specifically, interface 501 can use parameters 304 from the model engine 300 to provide multiple user adjustable options which can be used to modify parameters and/or ranges in response to output configurations. The adjustments made can cause the risk analyzer to calculate multiple new output configurations on the basis of the adjustments made without the need for a model to be regenerated in model engine 300. Accordingly, interface 501 provides an easy to understand and efficient way of allowing multiple parties to see in real time the effects that changes may have to a risk or environment. For example, for a given security risk relating to the provision of patching multiple machines or systems in an environment, an interface can allow a user to modify parameters or ranges relating to the number of machines or system to patch, a patch to be applied, and a timeframe for deploying a patching process. An interface 501 can also be provided which gives a user control over a model or template.

Figure 6:
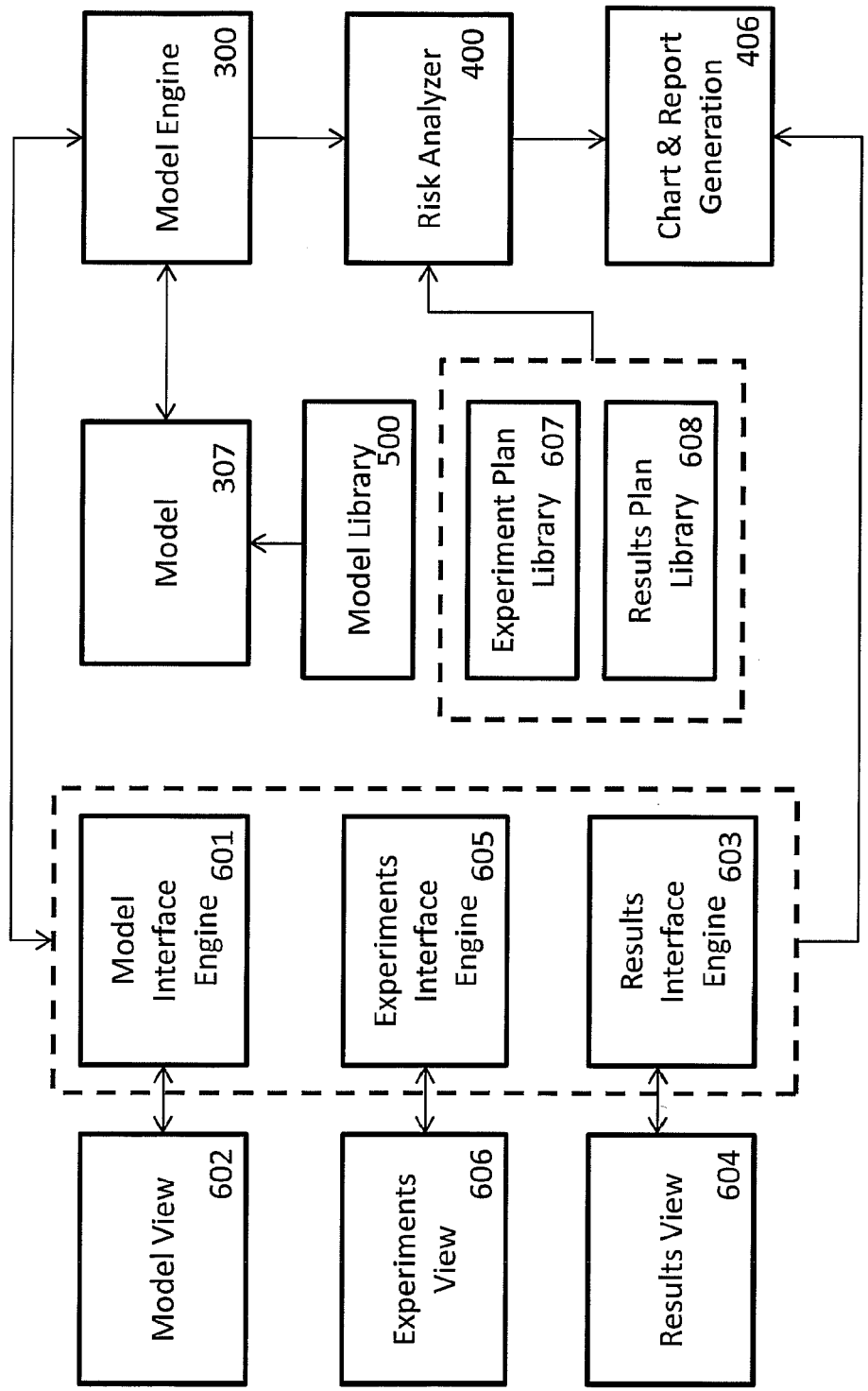
FIG. 6 is a schematic block diagram of a system for according to an example.

Accordingly, FIG. 6 is a schematic block diagram of a system according to an example. As before, a model library 500 includes a set of template models for modeling multiple different situations. The templates can be used as provided, or used as the basis for a model—that is, the templates can be amended by a user in order to more accurately represent the situation or risk being modeled. The system of FIG. 6 further includes an experiment plan library 607 and a results plan library 608. An experiment plan library 607 includes multiple files of machine readable instructions for experiments to be performed on a model from the model library 500. More specifically, the library 607 includes a set of templates for defining the way in which a model of a situation or risk can be used to generate results. For example, an experiment plan from library 607 can provide instructions representing parameters of a model to be varied in calculations and a range of variation of the parameters. Accordingly, since certain parameters from models of the model library 500 can be specific to certain situations or risks, experiment plans can be geared for generating a set of results for the specific situation in question by providing templates which affect those parameters which are relevant, such as those which may have an influence or bearing on a end result. According to an example, a model from model library 500 can have multiple relevant experiment plans associated with it, with each model/experiment plan combination providing a way of modeling a certain situation or risk.

Similarly, a results plan library 608 includes a set of multiple files of machine readable instructions defining multiple different ways in which results which have been calculated can be processed and displayed. For example, for a given model and experiment plan, results clusters 203 can be generated. A results plan can use the clusters to extract certain data of interest, which can then be used in chart and report generation 306. For a given model/experiment plan combination, multiple results plans can be used to extract different data from multiple corresponding results clusters 203.

According to an example, a package can be provided including a model template with an associated experiment and results plan which is defined to be applicable to a particular type of system. For example, in the field of access control, a generic and adjustable model template can be provided to model a system, and an experiments plan can be included which is predefined for generating multiple configurations for the system in response to changes in access controls. Similarly, a packaged results plan can provide access to results geared for a determination and analysis of data relating to access control.

The system of FIG. 6 further includes a model interface engine 601 and associated model view interface 602, a results interface engine 603 and associated results view interface 604, an experiments interface engine 605 and associated experiments view interface 606. Interfaces 602, 604, 606 provide mechanisms for users to interact with the system. The interfaces 602, 604, 606 provide mechanisms for users to interact with the system of FIG. 6 in different operating modes of the system. According to an example, certain ones of the modes can be restricted and unavailable to certain users.

Results interface engine 603 drives a results view interface 604. The results view interface 604 allows a user to make queries of the system using results which have already been generated in risk analyzer 400. For example, a given model from model library 500 in combination with an experiment plan from experiment plan library 607 and results plan from results plan library 608 are used in order to calculate clusters of results for a specific security risk. The results plan used specifies that certain data is extracted and used in chart and report generation 406 in order to provide a user with some predefined (according to the results plan) results, such as a set of graphs for example. The results view interface 604 allows a user with the appropriate permissions to initiate chart and report generation using calculated data in order to provide results outside of the scope of the results plan. According to an example, the results used for such chart and report generation are pre-existing—that is, the use of the results view interface does not cause new data to be calculated, it allows a user to query data already present and which may not have been displayed to the user (such as data not displayed to a user because it is outside of the results pan scope for example). A results interface engine 603 is therefore able to use data in existing results clusters 402.

Experiments interface engine 605 drives an experiments view interface 606 to provide a mode of operation of the system of FIG. 6, which allows a user with appropriate permissions to make queries which involve calculation of new results within the scope of the model being used. That is to say, the model 307 can be altered to an extent in order to allow results clusters 203 to be augmented with additional data which the user desires. Accordingly, via the experiments view interface 606, the experiments interface engine 605 can vary parameters 304 used and/or ranges of parameters used and investments 303 for example. Accordingly, experiments interface engine 605 is operatively coupled to the model engine 300 for the purposes of varying investments 303, associated parameters 304 and/or ranges for parameters. Such changes cause risk analyzer 400 to calculate further result clusters 302 using the extended search space. Such a mode of operation can be a mode which is considered to be more privileged than that associated with the results view interface mode of operation.

Model interface engine 601 drives a model view interface 602 to provide a mode of operation of the system of FIG. 5 which allows a user with appropriate permissions to make queries which involve a change in the model 307. For example, the view interface 602 can be used to alter internal 301 and/or external 302 components for a model 307. Investments 303, parameters 304 and associated ranges can also be changed in this mode. Accordingly, model interface engine 601 is operatively coupled to the model engine 300 for the purposes of varying internal components 301, external components 302, investments 303, parameters 304 and/or ranges for parameters for a model. Such a mode of operation can be a mode which is considered to be more privileged than that associated with the experiments view interface mode of operation.

Figure 7:
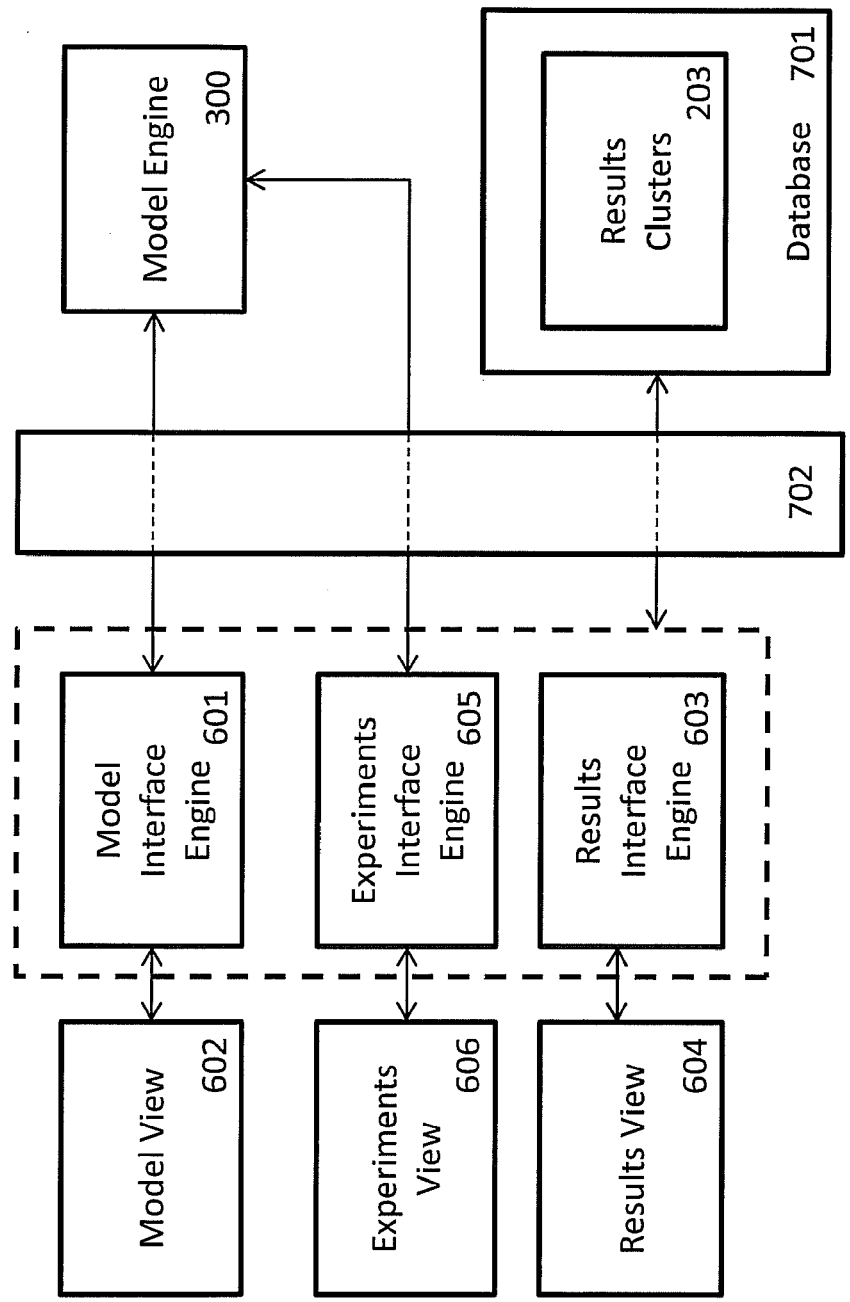
FIG. 7 is a schematic block diagram of a system according to an example.

FIG. 7 is a schematic block diagram of a system according to an example. As described with reference to FIG. 6, modes of operation using a model view interface 602 and experiments view interface 606 include the provision of using the model engine 300 to change a model or aspects of a model. Both interfaces also have access via their respective engines 601, 605 to the results clusters 203 so that existing data can be queried. Results view interface 604 has access to results clusters 203 (via results interface engine 603). According to an example, results clusters 203 can be stored in a database 701 which is accessible by engines 601, 605, 603 via a network 702. For example, the interfaces 602, 604, 606 can be web-based interfaces running in a browser such as Internet Explorer or Firefox or similar on a computing apparatus. Database 701 can be a database which is stored at a location which is remote from the apparatus and which communicates over a network 702 with the database 701. Network 702 can be a network which is internal to a company, such as a company intranet for example, or can be a public network such as the internet for example. Similarly, model engine 300 can be remotely queried over network 702. Alternatively, the database 701 and model engine 300 can be locally stored on a computing apparatus such as a desktop or laptop computer or other suitable device such as a mobile station.

According to an example, database 701 can store data representing packages as described above. In addition to unified packages/projects, database 701 can include information about people who have rights to access a package or project and a description of the package or project. The information can be stored as metadata for example.

Figure 8:
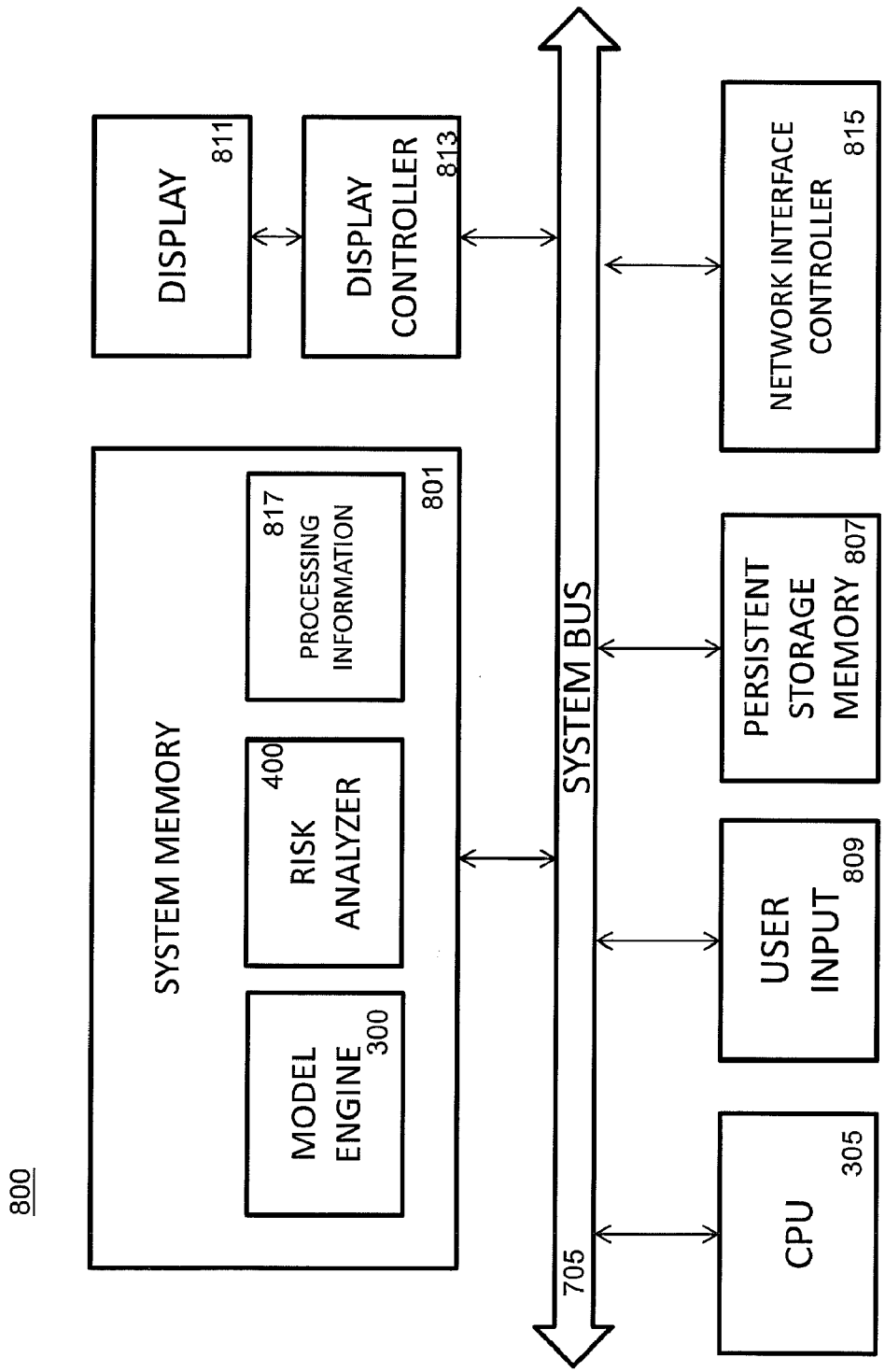
FIG. 8 is a schematic block diagram of a system according to an example.

FIG. 8 is a schematic block diagram of a system according to an example. The system 800 includes a processing unit 305, a system memory 801, and a system bus 805 that couples processing unit 305 to the various components of the system 800. The processing unit 305 typically includes a processor, such as a multi-core processor for example, which may be in the form of any one of various commercially available processors. The system memory 801 typically includes a read only memory (ROM) that stores a basic input/output system (BIOS) that contains start-up routines for the system 800 and a random access memory (RAM). The system bus 805 may be a memory bus, a peripheral bus or a local bus, and may be compatible with any of a variety of bus protocols, including PCI(e), VESA, Microchannel, ISA, and EISA. The system 800 also includes a persistent storage memory 807 (e.g., a hard drive (HDD), a CD-ROM drive, magnetic tape drives, flash memory devices, and digital video disks) that is connected to the system bus 805 and contains a computer-readable media disk to provide non-volatile or persistent storage for data, data structures and computer-executable instructions.

A user may interact (e.g., enter commands or data) with system 800 using input devices 809 (e.g., a keyboard, a computer mouse, a microphone, joystick, and touch pad or touch sensitive display screen). Information may be presented through a user interface that is displayed to a user on the display 811 (implemented by, e.g., a display monitor which can be touch sensitive, including a capacitive, resistive or inductive touch sensitive surface for example), and which is controlled by a display controller 813 (implemented by, e.g., a video graphics card). Accordingly, any one of the interfaces 602, 604, 606 can be presented to a user using display 811. A user can then interact with the interface using input devices 809 in order to cause CPU 305 and memory 801 to effect aspects of the system 800.

The system 800 also typically includes peripheral output devices, such as speakers and a printer. A remote computer may be connected to the system 800 through a network interface card (NIC) 815. Alternatively, system 800 can upload retrieved data, or a pointer thereto, to a remote storage service such as cloud based service for example. For example, a database 701 can be stored on a cloud based storage service, and results clusters 203 stored in database 701 can be queried over the network 702 using controller 815.

As shown in FIG. 8, the system memory 801 also stores model engine 300 and risk analyzer 400 as well as processing information 817 that can include results clusters 203, an experiment plan 405 and a results plan 407. A model library 500, experiment plan library 607 and results plan library 608 can be stored in persistent storage 807, or accessed at a remote storage location (not shown) using network controller 815.

Accordingly, in the system 800, model engine 300 receives a model 307 representing an environment 100 in which a vulnerability exists or has been determined and may present a potential security risk. Model 307 includes components for defining the current environment in terms of existing vulnerability and patching processes, and also includes components for allowing a user of the system 800 to determine the effects of changing or implementing a patching process aimed at mitigating the effects of the vulnerability.

A risk analyzer 400 of system 800 calculates multiple output configurations for the environment 100 as a result of processes in place and in view of the changes, and results are presented using display 811. Display 811 further enables a user of the system 800 to use multiple interfaces to adapt the system 800 for the purpose of modifying the results which are calculated and displayed. For example, a user can use an input device 809 to change aspects of a model 307 input to model engine 300 which results in risk analyzer 400 calculating a set of alternate results.

Figure 9:
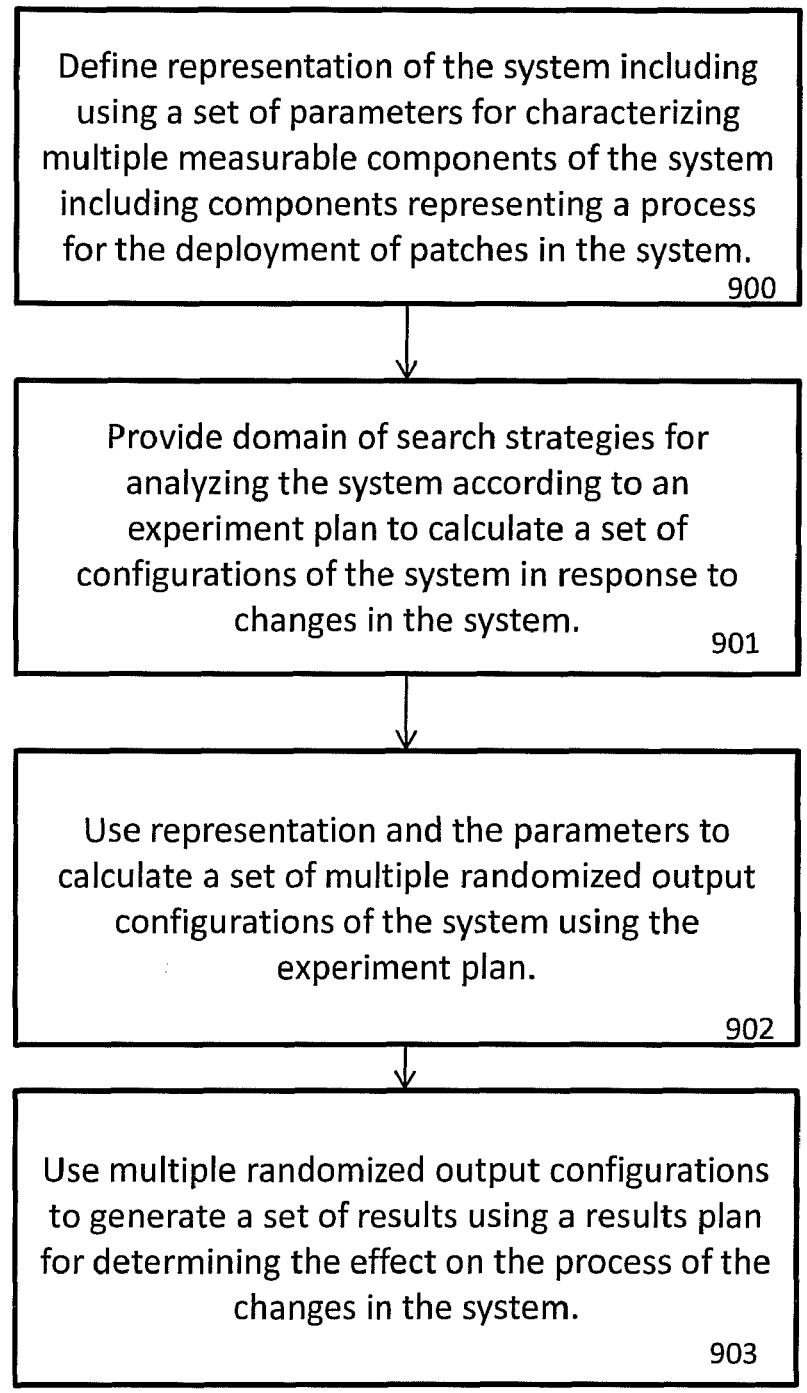
FIG. 9 is a block diagram of a method according to an example.

FIG. 9 is a schematic block diagram of a method for analyzing a process of a system according to an example. In block 900 a representation of the system is defined including using a set of parameters for characterizing multiple measurable components of the system including components representing a process for the deployment of patches in the system. In block 901 a domain of search strategies for analyzing the system according to an experiment plan to calculate a set of configurations of the system in response to changes in the system is provided. In block 902 the representation and the parameters are used to calculate a set of multiple randomized output configurations of the system using the experiment plan. In block 903 the multiple randomized output configurations are used to generate a set of results using a results plan for determining the effect on the process of the changes in the system.

What is claimed is:

1. A system for analyzing an environment to identify a security risk in a process, comprising:
 a processor; and
 a memory on which is stored machine readable instructions to cause the processor to:
  define components of a model of the environment, wherein the components include internal and external components and parameters of the defined components, wherein the components represent security controls to mitigate effects of the security risk, wherein the security controls include a patching process for the environment, and wherein the internal components include behavioral aspects that affect security including personnel movements and habits;
translate the components into instructions for the model;
calculate, based on the instructions for the model, multiple randomized instances of an outcome for the environment using multiple values for the parameters of the defined components of the model, the multiple values selected from within respective predefined ranges for the parameters, and
identify a security risk in the security controls using the multiple randomized instances.

2. The system as claimed in claim 1, further comprising:
multiple interface engines to control respective interfaces of the system to allow a user to control the system according to a mode of operation of an interface.

3. The system as claimed in claim 2, further comprising:
a network interface controller to control access from the multiple interface engines to a database for the system storing data representing a set of results clusters representing the multiple instances, wherein access to the database is controlled according to the mode of operation of a selected interface.

4. The system as claimed in claim 1, wherein the machine readable instructions are further to:
calculate multiple instances of an outcome for the environment using an experiment plan from an experiment plan library.

5. The system as claimed in claim 1,
wherein the representations of specific tasks undertaken in security operations further include a speed with which the specific tasks are undertaken, specific security solutions, mechanisms, and their properties, and the external components including representations corresponding to an external threat environment.

6. A system as claimed in claim 5, wherein the multiple internal and external components are provided as graphical representations for the system and wherein the model engine is further to compile machine readable instructions for the components based on the graphical representations.

7. The system as claimed in claim 1, wherein the security controls include intrusion prevention controls.

8. A method for analyzing a process of a system comprising:
defining a representation of the system using a template selected from a model library comprising a plurality of templates, each of the templates in the model library including a set of parameters for characterizing multiple measurable components of the system including components representing security controls to mitigate a security risk to the system, the security controls including a process for deployment of patches in the system;
providing a domain of search strategies for analyzing the system according to an experiment plan to calculate a set of configurations of the system in response to changes in the system;
calculating a set of multiple randomized output configurations of the system based on the experiment plan, the representation of the system, and the parameters; and
generating a set of results based on a results plan for determining an effect on the process of the changes in the system and the multiple randomized output configurations.

9. The method as claimed in claim 8, further comprising selecting the template based upon a determination of a set of investment choices associated with the security controls that mitigate a security risk to the system.

10. The method as claimed in claim 8, wherein calculating a set of multiple randomized output configurations includes setting multiple values for respective ones of the parameters based on a random number generator.

11. The method as claimed in claim 8, wherein the components include a graphical representation of the system, the method further comprising adjusting a measurable component of the graphical representation of the system to modify an output configuration; and
wherein the components include internal and external components for the model, the internal components including behavioral aspects that affect security including personnel movements and habits.

12. The method as claimed in claim 8, further comprising providing user interfaces for interacting with the representation and the set of results to redefine a search strategy or a component of the representation.

13. The method as claimed in claim 8, further comprising:
providing user interface views with different access privileges to control access to respective interface engines for changing the representation, experiment plan, and results plan.

14. The method as claimed in claim 13, further comprising:
providing multiple projects stored in a database, each project including data representing a model template, experiment plan, results plan, and metadata associated with the project including a description for the contents of the project and access control data defining access rights for a user accessing the database using a user interface view.

15. The method as claimed in claim 14, wherein projects are visible to a user on the basis of the user interface view used to access the database and according to access privileges of the user.

16. A system for analyzing a process for vulnerability management comprising:
a processor; and
a memory on which is stored machine readable instructions to cause the processor to:
define components of a model representing an environment including a vulnerability forming a security risk for the environment, wherein the components define the environment in terms of a mitigating control to mitigate effects of the security risk, and wherein the components include internal components that represent behavioral aspects that affect security including personnel movements and habits;
translate the components into instructions for the model; and
calculate, based on the instructions for the model, multiple output configurations for the environment as a result of the mitigating control and changes thereto.

17. The system as claimed in claim 16, further comprising:
a display to control user interfaces to allow the system to modify results obtained from the multiple output configurations.

18. The system as claimed in claim 16, wherein the mitigating control is a patching process for the environment, and wherein to calculate multiple output configurations for the environment, the machine readable instructions are further to calculate the output configurations as a result of the patching process.

19. The system as claimed in claim 16, wherein the machine readable instructions are further to generate data representing a measure of disruption in the environment as a result of the mitigating control.

20. A non-transitory machine-readable medium storing machine-readable instructions to be executed on a machine, the instructions, when executed by the machine, cause the machine to:
- receive data for a model representing a security risk, wherein the data includes internal and external components representing security controls to mitigate effects of the security risk, and wherein the internal components include behavioral aspects that affect security including personnel movements and habits, and an associated parameter for mitigating the security risk using a mitigating control;
- receive data representing an interval in which the parameter can be varied;
- receive data representing a randomized value for the parameter from within its associated interval;
- translate the received data to instructions for the model;
- execute the instructions for the model using the randomized value to calculate data for an output configuration for the security risk;
- receive data representing selection criteria for selecting a subset of the data for the output configuration; and
- display data for the subset to enable mitigation of the security risk.

* * * * *